United States Patent
Hoy et al.

(10) Patent No.: US 9,116,771 B2
(45) Date of Patent: Aug. 25, 2015

(54) MERGING WEIGHTED RECOMMENDATIONS FOR INSTALLATION AND CONFIGURATION OF SOFTWARE PRODUCTS

(71) Applicant: INTERNATIONAL BUSINESS MACHINES CORPORATION, Armonk, NY (US)

(72) Inventors: Jeffrey R. Hoy, Southern Pines, NC (US); Barry J. Pellas, Durham, NC (US); David M. Stecher, Seattle, WA (US)

(73) Assignee: International Business Machines Corporation, Armonk, NY (US)

( * ) Notice: Subject to any disclaimer, the term of this patent is extended or adjusted under 35 U.S.C. 154(b) by 52 days.

(21) Appl. No.: 14/141,850

(22) Filed: Dec. 27, 2013

(65) Prior Publication Data
US 2015/0186124 A1 Jul. 2, 2015

(51) Int. Cl.
*G06F 21/00* (2013.01)
*G06F 9/445* (2006.01)
*G06F 21/56* (2013.01)
*H04L 29/06* (2006.01)

(52) U.S. Cl.
CPC *G06F 8/61* (2013.01); *G06F 21/56* (2013.01); *H04L 63/145* (2013.01); *H04L 63/1408* (2013.01)

(58) Field of Classification Search
CPC ... G06F 21/56; H04L 63/145; H04L 63/1408; H04L 63/1416
USPC ............................................ 726/22; 717/174
See application file for complete search history.

(56) References Cited

U.S. PATENT DOCUMENTS

| | | | | |
|---|---|---|---|---|
| 6,865,737 | B1 * | 3/2005 | Lucas et al. | 717/178 |
| 7,376,947 | B2 * | 5/2008 | Evers | 717/174 |
| 2003/0037327 | A1 * | 2/2003 | Cicciarelli et al. | 717/178 |
| 2003/0163807 | A1 * | 8/2003 | Drake et al. | 717/174 |
| 2005/0251786 | A1 * | 11/2005 | Citron et al. | 717/106 |

(Continued)

OTHER PUBLICATIONS

Braswell, B. et al.; "Techniques for Managing Large WebSphere Installations"; IBM Corporation; www.ibm.com/redbooks/sg24-7536-00 . . . ; Mar. 2008.

*Primary Examiner* — Hadi Armouche
*Assistant Examiner* — Shahriar Zarrineh
(74) *Attorney, Agent, or Firm* — Law Office of John Timar (57) ABSTRACT

A method for installation and configuration of selectable components of a software product. An installation user interface allows a user to identify and select a plurality of install and configuration templates from multiple sources for recommended installation of selectable software components. Responsive to a user selecting multiple install and configuration templates, the user is enabled to apply a relative weight for each of the selected install and configuration templates, wherein the relative weight is applied to each selectable software component included in the weighted template. The weighted software components from each of the install and configuration templates are merged to determine a weighted value for each selectable component. Weighted software components having a weighted value that exceed a predetermined threshold value are determined. Each selectable component having a weighted value exceeding the predetermined threshold value is installed and configured including the components to install, the install path, and other configuration options.

14 Claims, 4 Drawing Sheets

(56) References Cited

U.S. PATENT DOCUMENTS

| | | | |
|---|---|---|---|
| 2005/0262501 A1* | 11/2005 | Marinelli et al. | 717/174 |
| 2007/0157172 A1* | 7/2007 | Zenz et al. | 717/121 |
| 2007/0220510 A1* | 9/2007 | Bell et al. | 717/174 |
| 2008/0127169 A1* | 5/2008 | Malasky et al. | 717/174 |
| 2008/0147635 A1 | 6/2008 | Im | |
| 2008/0168436 A1* | 7/2008 | Shwartz et al. | 717/174 |
| 2009/0006070 A1* | 1/2009 | Sasatani et al. | 703/22 |
| 2010/0058327 A1* | 3/2010 | Dehaan | 717/176 |
| 2010/0070871 A1 | 3/2010 | Liesche et al. | |
| 2012/0151470 A1* | 6/2012 | DeHaan | 717/177 |
| 2012/0271819 A1 | 10/2012 | Qiu et al. | |

* cited by examiner

Cygwin Setup - Select Packages

Select Packages
Select packages to install

Search [    ]  [Clear]   ○ Keep  ● Curr  ○ Exp   [View]  Pending

| Current | New | B... | S... | Categories | Size | Pa |
|---|---|---|---|---|---|---|
| 2.28.0-1 | ↻ 3.2.5-1 | ☒ | ☐ | Gnome | 299k | Go |
| 0.92.1pre2-1 | ↻ 6.7.6.3-2 | ☒ | ☐ | Graphics | 122k | lm |
|  | ↻ 0.92.1pre2-2 | ☒ | ☐ | X11 | 1,692k | W |
| 1.1.7-10 | ↻ 1.1.7-11 | ☒ | ☐ | Libs, Web, X11 | 286k | Xn |
| 1.1.7-10 | ↻ 1.1.7-11 | ☒ | ☐ | Devel, Libs, Web, X1 | 909k | Xn |
| 2.2.6-1 | ↻ 2.2.22-3 | ☒ | ☐ | Web | 771k | ap |
| 1.0.2-1 | ↻ 1.0.3-1 | ☒ | ☐ | X11 | 11k | ap |
| 8.5.3-1 | ↻ 8.6.3-1 | ☒ | ☐ | Devel, Python | 170k | as |
| 0.60.5-1 | ↻ 0.60.6.1-1 | ☒ | ☐ | Text | 437k | as |

☑ Hide obsolete packages

[<Back]  [Next>]  [Cancel]

FIG. 1

| Settings file: | http://expertCygwingBlog.com/favoptions.resp |
| Settings file: | c:\path\to\coworker\cygwinOptions.resp |
| Settings file: | http://cygwin.com/templates/UItemplates/allUI.resp |

FIG. 2

| Settings file: | http://expertCygwingBlog.com/favoptions.resp |
| Weight: | ————————————I— 8.5 |
| Settings file: | c:\path\to\coworker\cygwinOptions.resp |
| Weight: | ——I———————— 2.0 |
| Settings file: | http://cygwin.com/templates/UItemplates/allUI.resp |
| Weight: | ———I—————— 2.8 |

Installable Components:
 + Base
    + Graphics
      + X11
      + Gnome
      - KDE
      + Accessibility
    - Devel
    + Python
    - Interpres
 + Libs
 + Net
 + Text

FIG. 5

MERGING WEIGHTED RECOMMENDATIONS FOR INSTALLATION AND CONFIGURATION OF SOFTWARE PRODUCTS

BACKGROUND

Embodiments of the invention generally relate to software builds on computer systems and, more particularly, to installation and configuration of software packages on computer systems.

As software products become increasingly complex, the options for advanced installation and configuration become too difficult for normal users to manage. For example, a user installing a Linux® distribution may be presented with a thousand different software packages that can be installed optionally. Linux distributions (distros) represent different versions of the Linux operating system built on top of the Linux kernel and include a large collection of software applications. Linux distributions are normally segmented into packages, with each package including specific applications or service. Although some Linux distributions can install packages that include the kernel and core operating system components in a predetermined configuration, other software packages and components must be carefully configured to be useful and to work correctly with other software, resulting in administrators reviewing and reconfiguring software components.

Templates or response-file driven configurations can provide a better option to reuse good default settings, but a template file can become stale and individual settings are difficult to review.

BRIEF SUMMARY

In one embodiment, during software installation or, optionally, as a post-installation configuration, the installer software presents the user with a selection of optional components. The installer also presents a multi-form user interface display to "use recommendations from X," wherein the user can input a Uniform Resource Locator (URL) or a file to alter the default configuration settings for the software. The template provided includes recommended components to install, as well as recommended components that should be removed if they have been selected for installation. The installer software could allow the user to select an overall weight for each of the recommendation files. The installer software could allow any number of external configuration files to be added. The installer could scale each recommended item by the weight specified for the configuration file. When the software is ready to install, the installer combines the weight for each component from all sources, to determine if the component under consideration should be installed.

In one embodiment, a method is provided for installation and configuration of selectable components of a software product. An installation user interface is provided allowing a user to identify and select a plurality of install and configuration templates from multiple sources for recommended installation of selectable software components. Responsive to a user selecting multiple install and configuration templates, the user is enabled to apply a relative weight for each of the selected install and configuration templates, wherein the relative weight is applied to each selectable software component included in the weighted template. The weighted software components from each of the install and configuration templates are merged to determine a weighted value for each selectable component. Weighted software components having a weighted value that exceed a predetermined threshold value are determined. Each selectable component having a weighted value exceeding the predetermined threshold value is installed and configured including the components to install, the install path, and other configuration options.

BRIEF DESCRIPTION OF THE DRAWINGS

These and other advantages and aspects of the embodiments of the disclosure will become apparent and more readily appreciated from the following detailed description of the embodiments taken in conjunction with the accompanying drawings, as follows.

DETAILED DESCRIPTION

The following description is provided as an enabling teaching of embodiments of the invention including the best, currently known embodiment. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances. Thus, the following description is provided as illustrative of the principles of the invention and not in limitation thereof, since the scope of the invention is defined by the claims.

Figure 1:
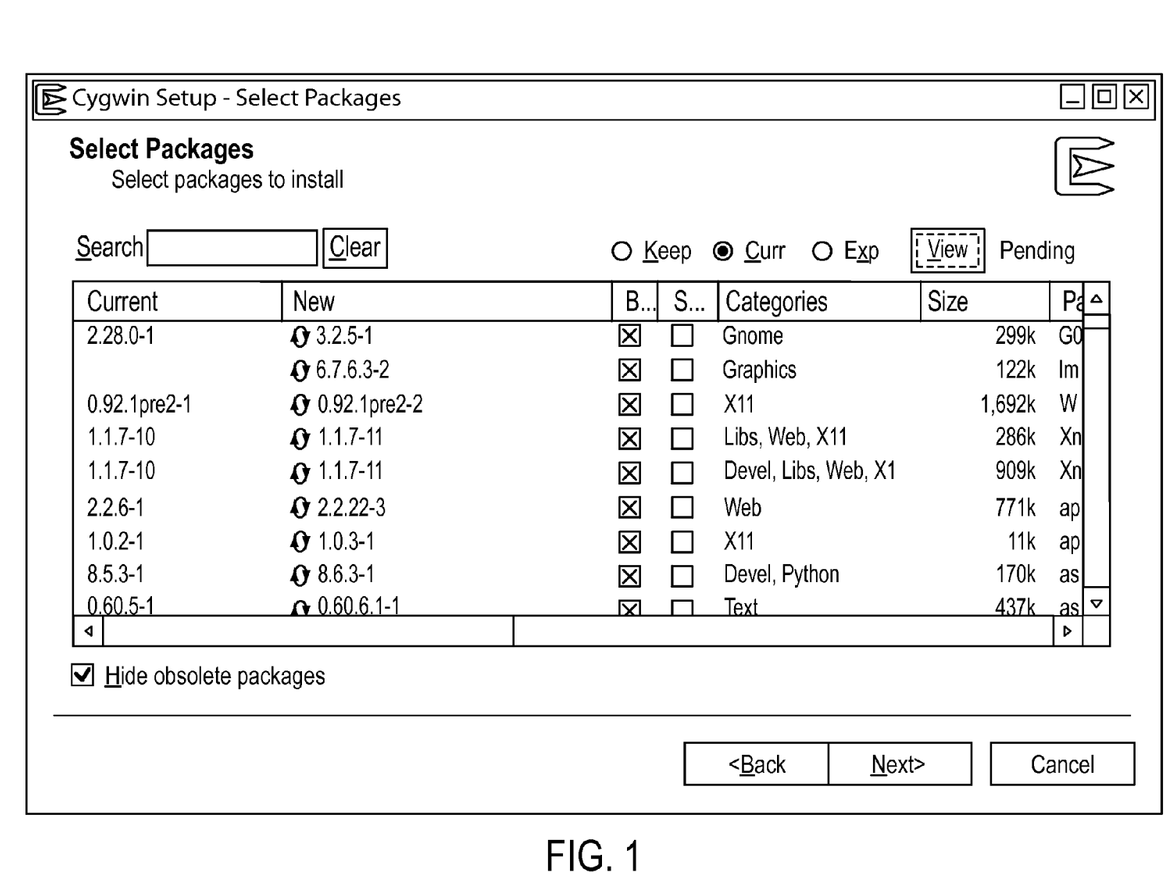
FIG. 1 illustrates an example setup graphical user interface (GUI) that enables the user to select packages to install.

A complex installation package could have thousands of installation options. For example, the Cygwin installer ("Cygwin Setup") will provide the user with a large list of optional software packages, with reasonable defaults selected. As indicated on the Cygwin project website. Cygwin is an open source collection of tools that provide a Linux look and feel environment for Windows® platforms. The user can pick and choose the packages that he wants to install and update them individually. The embodiments disclosed herein are applicable to any complex software installation package, but the open source Cygwin software is used to illustrate the principles. FIG. 1 illustrates a graphical user interface (GUI) that enables the user to select packages to install using the Cygwin installer.

Many users will accept the software defaults in the packages, or install everything, but better default values could be tailored for the user. A template or response-file driven configuration can provide a better option to reuse good default settings, but a template file can go stale and individual settings are hard to review. A better solution would be to point the installer to an online expert-provided configuration template, or to configurations from multiple experts, and use their settings as suggestions rather than requirements.

In one embodiment, installation and configuration templates can be combined, and interactive configuration templates can be used to change the default values. Configuration templates from multiple sources including web-based templates and file-based templates can be combined. Weighted configuration settings can be used for setting priorities.

Figure 2:
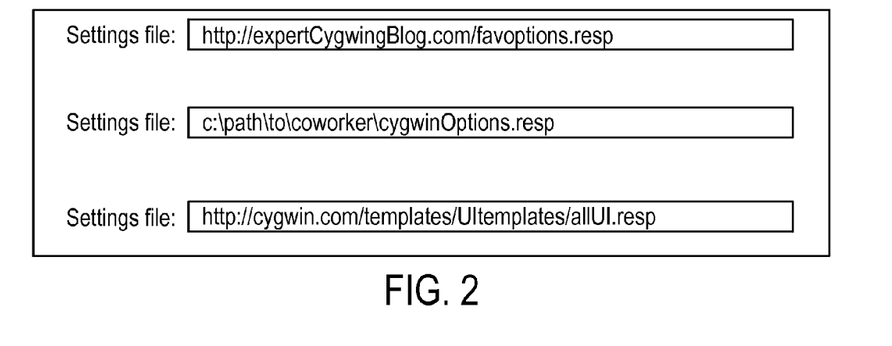
FIG. 2 illustrates a post-install configuration wizard in accordance with an embodiment.

An installer or post-install configuration wizard provides the option for the user to select multiple template files. The wizard allows the user to provide a response file or an option file that the user wants the installer to use during the software installation and configuration process on the user's computer. FIG. 2 illustrates a post-install configuration wizard in one embodiment.

Table 1 shows settings in each of the template (response) files using the Cygwin installer as an example. The plus sign before the name of a software option indicates that the option should be installed; a minus sign indicates that the option should be removed or not installed.

TABLE 1

| Filename: | Favoptions.resp | cygwinOptions.resp | allUI.resp |
|---|---|---|---|
| Purpose: | A set of cygwin options from the user's favorite blogger | A set of Cygwin options from the user's coworker | A template adds all UI |
| Specific Settings: | +X11 | +Base | +Graphics |
| | +Python | +Libs | +X11 |
| | +Gnome | +Net | +Gnome |
| | −Devel | +Text | +KDE |
| | −KDE | +Accessibility | |
| | −Interpreters | | |

Using multiple settings files as in the preceding example can create conflicts regarding the software components or packages to install. For example, in Table 1, there is a conflict between one of the options (i.e., KDE® software) listed in both the first and third columns. This conflict can be resolved by the user applying relative weights to each of the three settings files shown in FIG. 2.

Figure 3:
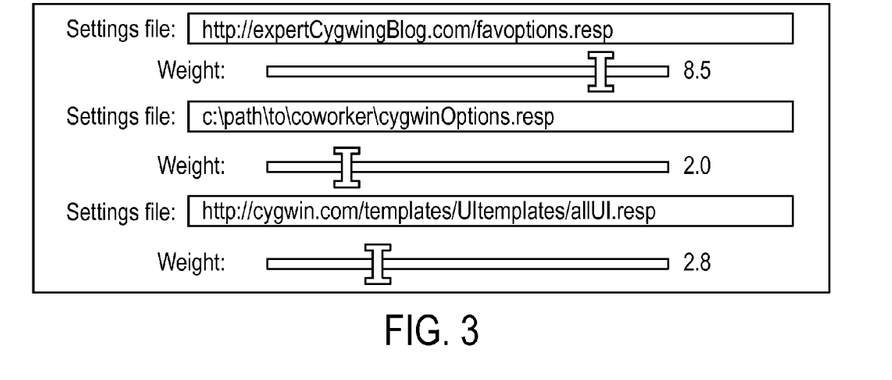
FIG. 3 illustrates example relative weights for the settings in each template file.

The post-install configuration wizard also provides an option for the user to specify relative weights for the settings in each of the template files. FIG. 3 illustrates relative weights for the settings in each template settings file shown in FIG. 2. As illustrated, the first template file ("favoptions") was given a relative weight of +8.5, the second template file ("cygwinoptions'") was given a weight of +2.0, and the third template file ("allU1") was given a weight of +2.8. In this example, the first template includes a set of software package install options from the end user's favorite blogger (including components to install and components to remove). The second template includes a set of software package install options from the end user's coworker. The third template includes the addition of specific software packages, in this example, graphics-related packages.

The installer then applies the user's specified relative weights to each of the components in the template files as shown in Table 2. For example, the X11 graphics library component was given a weight of 8.5 by the user for the first settings file and a weight of 2.8 for die third settings file. The combined relative weight of the X11 component for all three settings files is thus +11.5.

TABLE 2

| Favoptions.resp | cygwinOptions.resp | allUI.resp |
|---|---|---|
| +8.5 X11 | +2.0 Base | +2.8 Graphics |
| +8.5 Python | +2.0 Libs | +2.8 X11 |
| +8.5 Gnome | +2.0 Net | +2.8 Gnome |

TABLE 2-continued

| Favoptions.resp | cygwinOptions.resp | allUI.resp |
|---|---|---|
| −8.5 Devel | +2.0 Text | +2.8 KDE |
| −8.5 KDE | +2.0Accessibiliy | |
| −8.5 Interpreters | | |

The installer combines the weighted values for each component across all templates. The combined weights for each component, shown parenthetically, include X11 (+11.3), Gnome (+11.3), Python (+8.5), Graphics (+2.8), Base (+2.0), Libs (+2.0), Net (+2.0), Text (+2.0), Accessibility (+2.0), KDE (−5.7), Interpreters (−8.5), Devel (−8.5). In one embodiment, any package having a total positive weight is selected for installation, and any package with a negative total weight is removed from installation. Thus, continuing with this example, X11, Gnome®, Python®, Graphics, Base, Libs, Net, Text, and Accessibility components or packages (i.e., downloadable software tools) would be installed. The components not installed, or removed if installed, are KDE, Interpreters, and Devel. Other embodiments could include selection based on other weighting criteria, e.g., selection could be based on having a total weight that exceeds a certain value. Table 3 lists the packages selected and the packages deleted based on weighted value.

TABLE 3

| Packages added (if not selected already) | Packages removed (if selected) |
|---|---|
| X11 | KDE |
| Gnome | Interpreters |
| Python | Devel |
| Graphics | |
| Base | |
| Libs | |
| Net | |
| Text | |
| Accessibility | |

Under certain conditions, the merged recommendations could break a dependency tree. For example, consider the case where one response file adds a component and its dependencies (i.e., subcomponents), but a higher-weighted response file removes one of those dependencies without removing the subcomponent. In one embodiment, two straightforward solutions are available. A first solution is to add the broken dependencies to complete the dependency tree for selected components. A second solution is to remove components with missing dependencies, i.e., to prune unsupported components out of the dependency tree. The choice of "adding" or "pruning" could depend on context and could be configured based on: (1) an option selected by the user, and (2) setting by the installer. Installers with generally non-dangerous optional components could implement "add" broken dependencies. For example, if the broken dependency is a child subcomponent in a parent component-dependent child subcomponent relationship, the parent component could be added automatically by the installer. Installers having some components which may be undesirable could implement "prune" unsupported components. Alternatively, the component in the response file could define if the dependencies should be added or pruned. The aggregate highest-weighted option would be used.

For a simplified example, consider a Firefox® web browser installer that could allow optional selection of four components: (1) Firebug® debugger add-on, (2) Facebook® tools add-on, (3) Adblock add-on, and (4) Default adblock filterset G.

As shown in Table 4 below, the user could specify two response files to be used by the installation: (1) "everything.resp" from the Firefox website to install all four components (weight: 2.0) and (2) "nomalware.resp" from the user's favorite blogger to remove extensions that are at risk for containing malware (weight: 8.0).

TABLE 4

| everything.resp | normalware.resp |
|---|---|
| +2.0 firebug (+2.0 dependencies: add) | −8.0 facebook (+8.0 dependencies: prune) |
| +2.0 facebook (+2.0 dependencies: add) | −8.0 adblock (+8.0 dependencies: prune) |
| +2.0 adblock (+2.0 dependencies: add) | |
| +2.0 filterset G (+2.0 dependencies: add) | |

In this case. "everything.resp" adds all four optional components, and "nomalware.resp" removes the facebook and adblock plugins, and contains recommendations to prune dependencies.

As shown in Table 5, the installer hits a dependency conflict since filterset G is selected, but adblock is deselected. The installer looks at the recommended dependency handling on the dependency. In this case, "prune dependencies" is weighted higher than "add dependencies" so the installer removes all children of the adblock feature (i.e., filterset G). Facebook would not be installed since the combined relative weighting is −6.0 (+2.0 weight for "everything.resp" and a −8.0 weight for "nomalware.resp"). In the end, the Firefox browser is installed with one optional component—firebug.

TABLE 5

+2.0 firebug (+2.0 dependencies: add)
−6.0 facebook (+2.0 dependencies: add, +8.0 dependencies: prune)
−6.0 adblock (+2.0 dependencies: add, +8.0 dependencies: prune)
+2.0 filterset G (+2.0 dependencies: add)

Figure 4:
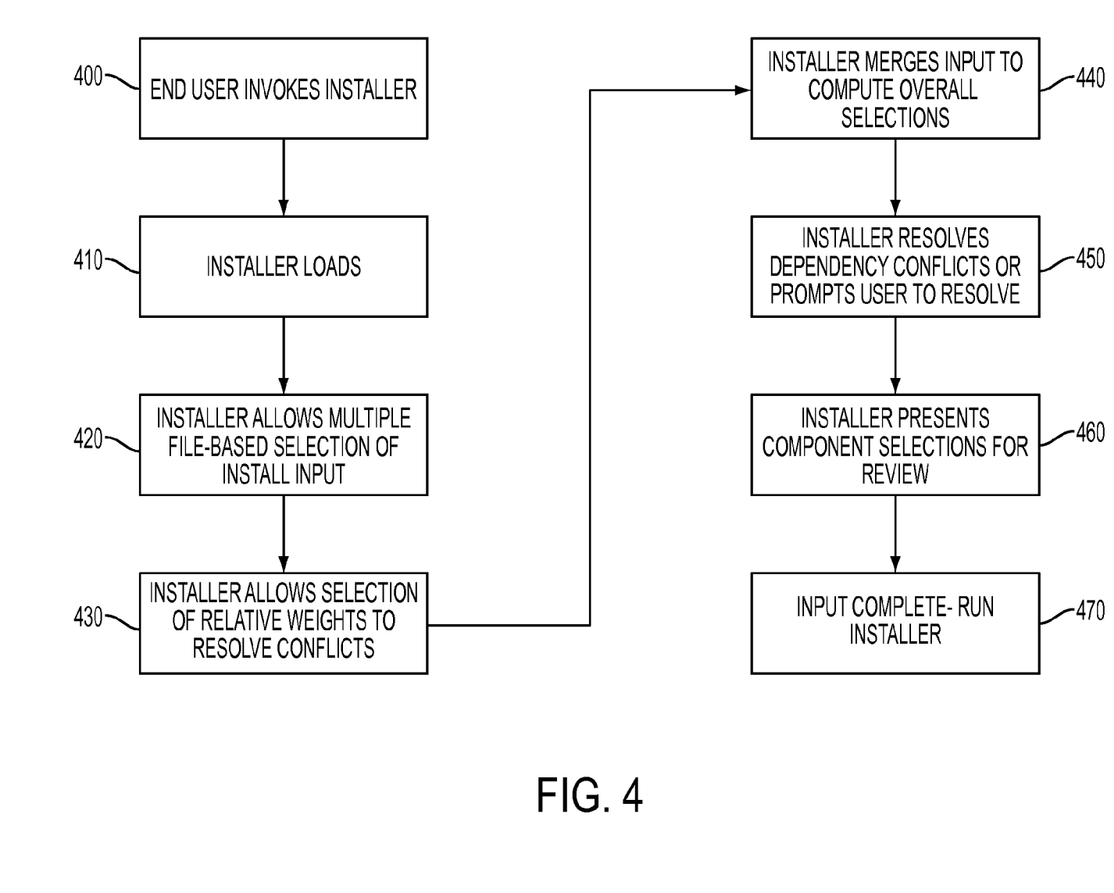
FIG. 4 illustrates processing logic for weighted recommendations for installation and configuration of software products in accordance with an embodiment.
Figure 5:
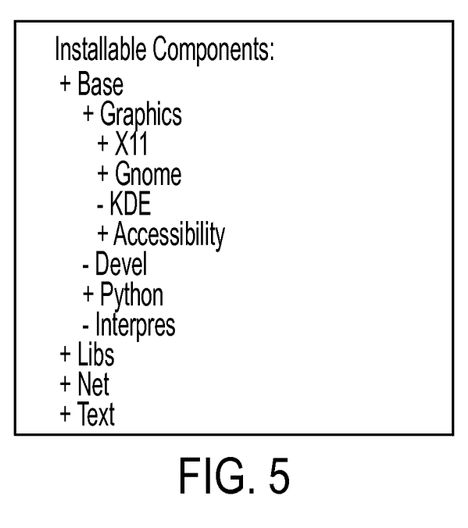
FIG. 5 illustrates a display of installable components that the installer software could present to the end user for review in accordance with an embodiment.

FIG. 4 illustrates processing logic for merging weighted recommendations for installation and configuration of software products in an exemplary embodiment. The process starts with the end user invoking the software program installer as indicated in logic block 400. The installer software then loads in computer memory as indicated in logic block 410. The installer software allows multiple file-based selection of install input from various sources as indicated in logic block 420 and as depicted by the multiple setting files (also referred to herein as input source templates) in FIG. 2. Next, as indicated in logic block 430, the installer software allows user selection of relative weights to apply to each of the multiple input source templates as depicted in FIG. 3. The installer software then merges the component weights from the multiple input sources, as shown in Table 2, to compute overall software component selections as indicated in logic block 440. The installer wizard automatically resolves dependency conflicts or prompts the user to resolve dependency conflicts as indicated in logic block 450. The installer software then presents the component selections to the end user for review as indicated in logic block 460. FIG. 5 illustrates an example display of installable components that the installer could present to the end user for review based on the example for Cygwin package installation. After the end user finishes the review, the installer software runs on the processor and installs the selected software components to complete the software program installation as indicated in logic block 470.

In summary, unique aspects of the disclosed embodiments include combining install and configuration templates, using interactive configuration templates to affect the default values, combining configuration templates from multiple sources including web and file-based templates, and weighted configuration settings for setting priority.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means plus function elements in any claims below are intended to include any structure, material, or acts for performing the function in combination with other claim elements as specifically claimed.

Those skilled in the art will appreciate that many modifications to the disclosed embodiments are possible without departing from the scope of the present invention. In addition, it is possible to use some of the features of the embodiments disclosed without the corresponding use of the other features. Accordingly, the foregoing description of the disclosed embodiments is provided for the purpose of illustrating the principles of the invention, and not in limitation thereof, since the scope of the invention is defined solely by the appended claims.

What is claimed:

1. A method for installation and configuration of selectable components of a software product, the method comprising:
    providing an installation user interface allowing a user to identify and select a plurality of install and configuration templates from multiple input sources for recommended installation of selectable software components;
    responsive to a user selecting multiple install and configuration templates, enabling the user to apply a relative weight for each of the selected install and configuration templates, wherein the relative weight is applied to each selectable software component included in the weighted template;
    merging the weighted software components from each of the install and configuration templates to determine a weighted value for each selectable component;
    determining the weighted software components having a weighted value that exceed a predetermined threshold value;
    installing and configuring each selectable component having a weighted value exceeding the predetermined threshold value including the components to install, the install path, and other configuration options;
    removing selectable software components having a weighted value that is less than the predetermined threshold value;
    applying a subcomponent dependency ranking adjustment; and
    automatically resolving a subcomponent dependency conflict.

2. The method for installation and configuration of selectable components of claim 1 wherein the multiple input sources for recommended installation of selectable software components are selected from a group comprising internal, file and web-based templates, each input source specifying the selectable software components to install and the selectable software components that should not be installed.

3. The method for installation and configuration of selectable components of claim 1 wherein applying a subcomponent dependency ranking adjustment is based on a risk of installing a selectable software component containing malware.

4. The method for installation and configuration of selectable components of claim 1 wherein automatically resolving a subcomponent dependency conflict comprises pruning the subcomponent.

5. The method for installation and configuration of selectable components of claim 1 wherein automatically resolving a subcomponent dependency conflict comprises adding a parent component.

6. The method for installation and configuration of selectable components of claim 1 wherein automatically resolving a subcomponent dependency conflict comprises applying a relative weight to add or prune the dependent components for each selectable software component in the selected install and configuration templates.

7. A computer program product for installation and configuration of selectable components of a software product when executed on a computer processor, the computer program product comprising a non-transitory tangible computer readable medium having embedded thereon:
    program instructions that cause the processor to provide an installation user interface allowing a user to identify and select a plurality of install and configuration templates from multiple input sources for recommended installation of selectable software components;

program instructions that cause the processor to enable the user to apply a relative weight for each of the selected install and configuration templates, wherein the relative weight is applied to each selectable software component included in the weighted template;

program instructions that cause the processor to merge the weighted software components from each of the install and configuration templates to determine a weighted value for each selectable component;

program instructions that cause the processor to determine the weighted software components having a weighted value that exceeds a predetermined threshold value;

program instructions that cause the processor to install and configure each selectable component having a weighted value exceeding the predetermined threshold value including the components to install, the install path, and other configuration options;

program instructions that cause the processor to remove selectable software components having a weighted value that is less than the predetermined threshold value;

program instructions that cause the processor to apply a subcomponent dependency ranking adjustment; and program instructions that cause the processor to automatically resolve a subcomponent dependency conflict.

8. The computer program product for installation and configuration of selectable components of claim 7 wherein the program instructions that cause the processor to apply a subcomponent dependency ranking adjustment are based on a risk of installing a selectable software component containing malware.

9. The computer program product for installation and configuration of selectable components of claim 7 further comprising program instructions that cause the processor to automatically resolve a subcomponent dependency conflict by pruning the subcomponent.

10. The computer program product for installation and configuration of selectable components of claim 7 further comprising program instructions that cause the processor to automatically resolve a subcomponent dependency conflict by adding a parent component.

11. The computer program product for installation and configuration of selectable components of claim 7 further comprising program instructions that cause the processor to automatically resolve a subcomponent dependency conflict by applying a relative weight to add or prune the dependent components for each selectable software component in the selected install and configuration templates.

12. A system for installation and configuration of selectable components of a software product, the system comprising:

a memory device for storing a plurality of software modules;

a processor for loading and executing the plurality of modules, including:

a module for providing an installation user interface allowing a user to identify and select a plurality of install and configuration templates from multiple input sources for recommended installation of selectable software components;

a module for enabling the user to apply a relative weight for each of the selected install and configuration templates, wherein the relative weight is applied to each selectable software component included in the weighted template;

a module for merging the weighted software components from each of the install and configuration templates to determine a weighted value for each selectable component;

a module for determining the weighted software components having a weighted value that exceed a predetermined threshold value;

a module for installing and configuring each selectable component having a weighted value exceeding the predetermined threshold value including the components to install, the install path, and other configuration options;

a module for removing selectable software components having a weighted value that is less than the predetermined threshold value;

a module for applying a subcomponent dependency ranking adjustment; and a module for automatically resolving a subcomponent dependency conflict.

13. The system for installation and configuration of selectable components of claim 12 wherein the module for applying a subcomponent dependency ranking adjustment is based on a risk of installing a selectable software component containing malware.

14. The system for installation and configuration of selectable components of claim 12 further comprising a module for applying a relative weight to add or prune the dependent components for each selectable software component in the selected install and configuration templates.

* * * * *